(12) United States Patent
Flynn et al.

(10) Patent No.: US 11,747,884 B2
(45) Date of Patent: *Sep. 5, 2023

(54) SYSTEMS AND METHODS FOR REDUCING ENERGY CONSUMPTION

(71) Applicant: Level 3 Communications, LLC, Broomfield, CO (US)

(72) Inventors: Matthew Flynn, Broomfield, CO (US); Jason Huselton, Erie, CO (US); Paul Brannigan, Brighton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,108

(22) Filed: Jul. 18, 2022

(65) Prior Publication Data

US 2022/0350391 A1    Nov. 3, 2022

Related U.S. Application Data

(63) Continuation of application No. 17/334,435, filed on May 28, 2021, now Pat. No. 11,397,459.

(60) Provisional application No. 63/036,789, filed on Jun. 9, 2020.

(51) Int. Cl.
*G06F 1/324*     (2019.01)
*G06F 1/3234*    (2019.01)
*G06F 1/20*      (2006.01)

(52) U.S. Cl.
CPC .............. *G06F 1/324* (2013.01); *G06F 1/20* (2013.01); *G06F 1/3268* (2013.01)

(58) Field of Classification Search
CPC .......... G06F 1/20; G06F 1/324; G06F 1/3268
See application file for complete search history.

(56) References Cited

U.S. PATENT DOCUMENTS

| | | | |
|---|---|---|---|
| 11,397,459 B2 * | 7/2022 | Flynn | ........................ G06F 1/28 |
| 2018/0081629 A1 * | 3/2018 | Kuhhirte | ............. G06F 16/2471 |
| 2021/0382537 A1 | 12/2021 | Flynn | |

* cited by examiner

*Primary Examiner* — Mark A Connolly (57) ABSTRACT

Methods and systems for reducing energy consumption. A method may include aggregating, for a prior time period, prior usage data from a plurality of computing nodes. Based on the aggregated prior usage data from the plurality of computing nodes, a usage threshold for decreasing cooling system output for the plurality of computing nodes and a local-time threshold for decreasing the cooling system output for the plurality of computing nodes are determined. Current usage data for the plurality of computing nodes is then received. When the current usage data reaches the usage threshold and the local time is after the local-time threshold, output of the cooling systems of the plurality of computing nodes is decreased.

14 Claims, 8 Drawing Sheets

SYSTEMS AND METHODS FOR REDUCING ENERGY CONSUMPTION

BACKGROUND

Users of computing devices have more commonly been relying on resource remote from the computing device itself to perform operations and tasks. The remote resources are sometimes referred to as cloud-based resources. For example, video streaming services often rely on the delivery of video content to a user's computing device rather than having the video content stored locally on the user's computing device. The physical computing components that provide these remote resources generate heat and often require cooling systems that require substantial amounts of energy to operate.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for reducing energy consumption in computing nodes. In an aspect, the technology relates to a system for reducing energy consumption in providing remote resources. The system includes a first plurality of computing nodes in a first time zone, wherein the first plurality of computing nodes include cooling systems; a second plurality of computing nodes in a second time zone, wherein the second plurality of computing nodes include cooling systems; and an energy management device including a processor and memory storing instructions that when executed cause the system to perform a set of operations. The set of operations includes aggregating prior usage data from the first plurality of computing nodes and aggregating prior usage data from the second plurality of computing nodes. The operations further include, based on the aggregated prior usage data from the first plurality of computing nodes, determining a first usage threshold for decreasing cooling system output for the first plurality of computing nodes; and based on the aggregated prior usage data from the second plurality of computing nodes, determining a second usage threshold for decreasing cooling system output for the second plurality of computing nodes. The operations further include receiving current usage data for the first plurality of computing nodes; detecting that the current usage data for the first plurality of computing nodes has reached the first usage threshold; based on a local time for the first plurality of nodes and the current usage data for the first plurality of computing nodes reaching the first usage threshold, decreasing output of the cooling systems of the first plurality of computing nodes; receiving current usage data for the second plurality of computing nodes; detecting that the current usage data for the second plurality of computing nodes has reached the second usage threshold; and based on a local time for the second plurality of nodes the current usage data for the second plurality of computing nodes reaching the second threshold, decreasing output of the cooling systems of the second plurality of computing nodes.

In an example, the cooling systems of the first plurality of computing nodes include fans, and decreasing the output of the cooling systems includes decreasing a speed of at least a subset of the fans. In another example, the operations further include identifying a peak of the current usage data for the first plurality of computing nodes; determining a slope between the peak and a threshold intersection point of the current usage data for the first plurality of computing nodes; determining that a magnitude of the determined slope is less than a peak-to-threshold slope threshold; and decreasing output of the cooling systems of the first plurality of nodes is further based on the determination that magnitude of the determined slope is less than the peak-to-threshold slope threshold. In yet another examples, the operations further include determining a slope immediately prior to a threshold intersection point of the current usage data for the first plurality of computing nodes; determining that a magnitude of the determined slope is less than an immediate-slope threshold; and decreasing output of the cooling systems of the first plurality of computing nodes is further based on the determination that magnitude of the determined slope is less than the immediate-slope threshold.

In another example, the operations further include based on a local time for the first plurality of nodes and the current usage data for the first plurality of computing nodes reaching the first usage threshold, decreasing performance of the first computing nodes by reducing at least one of a drive speed or a CPU clock speed. In a further example, decreasing the output of the cooling systems includes decreasing the output of only a portion of the cooling systems. In still another example, the first plurality of computing nodes and the second plurality of computing nodes are part of a content delivery network.

In another aspect, the technology relates to a method for reducing energy consumption in providing remote resources. The method includes receiving current usage data for a first plurality of computing nodes in a first time zone; detecting that the current usage data for the first plurality of computing nodes has reached a first usage threshold; based on a local time for the first time zone and the current usage data for the first plurality of computing nodes reaching the first usage threshold, decreasing output of cooling systems of the first plurality of computing nodes; receiving current usage data for a second plurality of computing nodes in a second time zone; detecting that the current usage data for the second plurality of computing nodes has reached a second usage threshold; and based on a local time for the second plurality of nodes the current usage data for the second plurality of computing nodes reaching the second threshold, decreasing output of cooling systems of the second plurality of computing nodes.

In an example, the method further includes identifying a peak of the current usage data for the first plurality of computing nodes; determining a slope between the peak and a threshold intersection point of the current usage data for the first plurality of computing nodes; determining that a magnitude of the determined slope is less than a peak-to-threshold slope threshold; and decreasing output of the cooling systems of the first plurality of nodes is further based on the determination that magnitude of the determined slope is less than the peak-to-threshold slope threshold. In another example, the method further comprises determining a slope immediately prior to a threshold intersection point of the current usage data for the first plurality of nodes; determining that a magnitude of the determined slope is less than an immediate-slope threshold; and decreasing output of the cooling systems of the first plurality of nodes is further based on the determination that magnitude of the determined slope is less than the immediate-slope threshold.

In a further example, the method further includes determining, at a time duration subsequent to the current usage data for the first plurality of computing nodes reaching the first usage threshold, that the current usage data remains below the first usage threshold; and decreasing output of the cooling systems of the first plurality of nodes is further based on the determination that the current usage data remains below the first usage threshold. In still another example, the method further comprises, based on the local time for the for the first time zone and the current usage data for the first plurality of computing nodes reaching the first usage threshold, decreasing performance of the first computing nodes by reducing at least one of a drive speed or a CPU clock speed. In yet another example decreasing the output of the cooling systems includes decreasing the output of only a portion of the cooling systems. In still yet another example, the first plurality of computing nodes and the second plurality of computing nodes are part of a content delivery network.

In another aspect, the technology relates to a method for reducing energy consumption in providing remote resources. The method includes aggregating, for a prior time period, prior usage data from a plurality of computing nodes; and based on the aggregated prior usage data from the plurality of computing nodes: determining a usage threshold for decreasing cooling system output for the plurality of computing nodes; and determining a local-time threshold for decreasing the cooling system output for the plurality of computing node. The method further includes receiving current usage data for the plurality of computing nodes; and when the current usage data reaches the usage threshold and the local time is after the local-time threshold, decreasing output of the cooling systems of the plurality of computing nodes.

In an example, the method further includes subsequent to decreasing output of the cooling systems, receiving subsequent usage data for the plurality of computing nodes; detecting that the subsequent usage data has reached an activation threshold; and based on detecting that the subsequent usage data has reached an activation threshold, increasing output of the cooling systems of the plurality of computing nodes. In another example, the method further includes based on the aggregated prior usage data, determining a peak-to-threshold slope threshold; identifying a peak of the current usage data; determining a slope between the peak and a threshold intersection point of the current usage data; determining that a magnitude of the identified slope is less than a peak-to-threshold slope threshold; and decreasing output of the cooling systems is further based on the determination that magnitude of the identified slope is less than the peak-to-threshold slope threshold. In a further example, the method further includes based on the aggregated prior usage data, determining an immediate-slope threshold; determining a slope immediately prior to a threshold intersection point of the current usage data; determining that a magnitude of the determined slope is less than the immediate-slope threshold; and decreasing output of the cooling systems is further based on the determination that magnitude of the determined slope is less than the immediate-slope threshold. In yet another example, the method further includes, when the current usage data reaches the usage threshold and the local time is after the local-time threshold, decreasing performance of the plurality computing nodes. In still another example, the plurality of computing nodes are part of a content delivery network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

As discussed briefly above, remote resources are often utilized to provide content or process data. For example, content servers in a content delivery network (CDN) provide content, such a streaming video, to local devices. The hardware components of the remote resources, such as content servers, require substantial amounts of energy to operate. In addition, due to the heat generated by the hardware components, substantial energy is also required to cool the hardware. Cooling of the hardware may be performed through the use of fans or other cooling systems. In many implementations, the cooling systems operate continuously or in a reactive manner based on temperature measurements. For example, the cooling systems may react to an increase in temperature of a particular hardware component. Such a reactive process requires the hardware component to already be heating prior to the cooling system being initiated. Thus, the cooling system is continually attempting to catch up to reduce the temperature of the hardware component, which results increased energy consumption and, often, worse performance.

The present technology implements methods and systems that reduce the energy consumption of the remote resources by proactively activating and deactivating hardware components and cooling systems based on utilization, such as bandwidth consumption. For example, the technology may activate or initiate cooling systems and other components prior to the time that they are needed. Thus, the cooling may begin prior substantial increases in temperature, allowing for better temperature regulation. The technology may also deactivate cooling systems and other components when they are no longer needed in order to reduce energy consumption. Determining the appropriate time to deactivate or turn down the cooling systems, however, presents risks relating to potentially deactivating cooling systems prematurely. If the cooling systems are deactivated prematurely, the hardware components may overheat and become damaged.

To properly reduce the output of the cooling systems, the present technology analyzes usage data over prior periods of time to make determinations as to when it is safe to deactivate the cooling systems. As an example, for streaming video services provided by CDNs, the demand for services may be cyclic throughout the day. For instance, peak demand may occur between roughly 4:00-7:00 PM each day. Streaming services continue to be requested through the evening and then demand drops off later in the night, where demand remains low until the next morning. Based on aggregating demand for services in particular regions from a prior day (or days), an appropriate time to turn down the cooling systems may be made for a current day. A set of heuristics may be applied to demand data of the current day, and when those heuristics are satisfied, the cooling systems are turned down until the next morning or until demand is expected. Thus, energy may be conserved during that time span. The same or similar logic may be used to reduce the performance of other computing components, such as by deactivating or turning down those computing components.

Figure 1A:
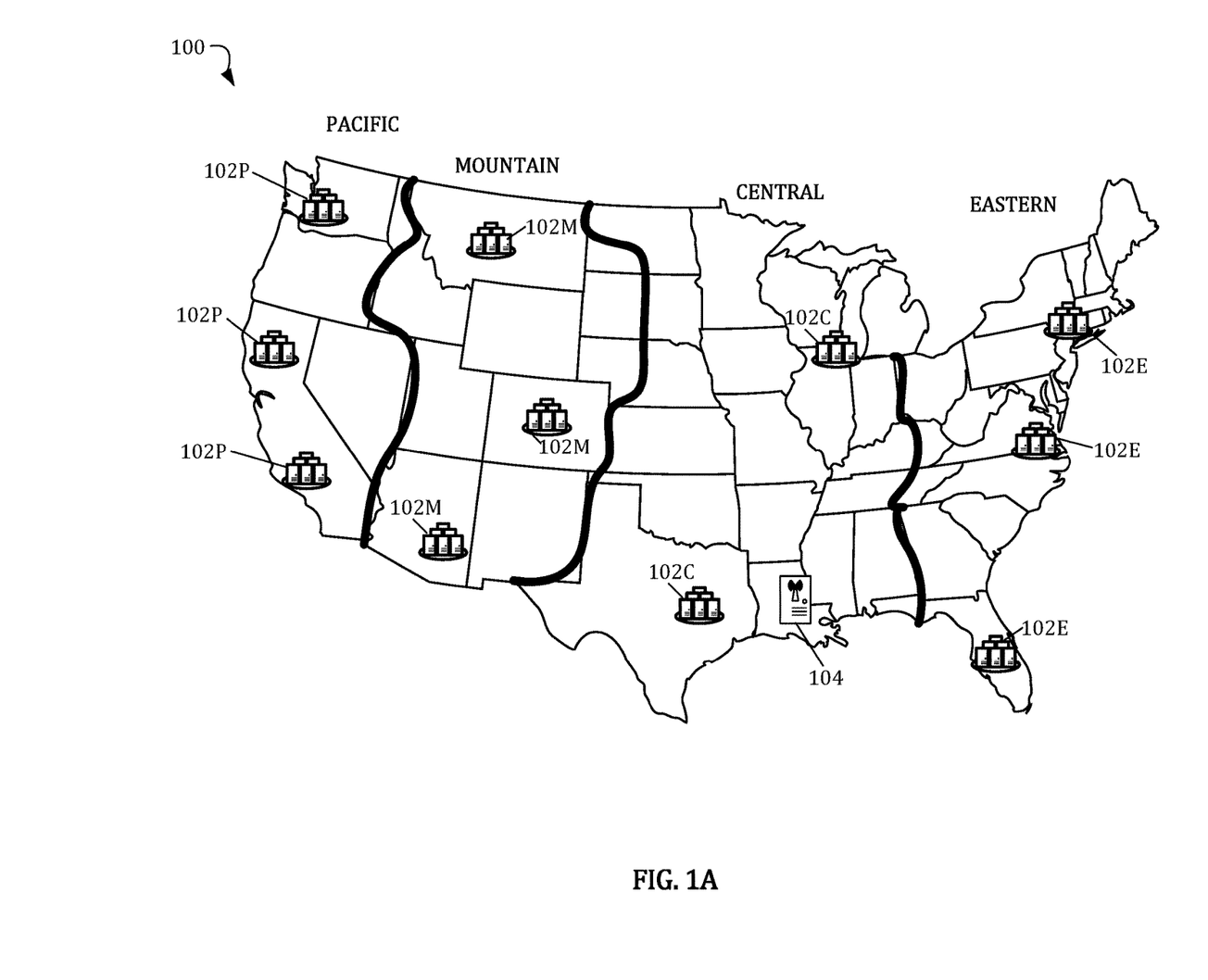
FIG. 1A depicts a system for providing remote resources.

FIG. 1A depicts a system 100 for providing remote resources. The system includes a plurality of computing nodes 102. The computing nodes 102 provide remote computing resources to users. As one example, the computing nodes 102, or a portion thereof, may be nodes of a CDN and configured to deliver content, such as streaming services, to users. In other examples, the computing nodes 102, or a portion thereof, may be edge compute nodes of an edge compute network. Other types of computing nodes and networks are also possible. In addition, more or fewer computing nodes 102 than are depicted may be present in system 100.

In the particularly depicted example, the system 100 includes computing nodes 102 that are located in different time zones of the United States. In the example depicted, the Pacific Time Zone includes three Pacific computing nodes 102P. The Mountain Time Zone includes three Mountain computing nodes 102M. The Central Time Zone includes two Central computing nodes 102C. The Eastern Time Zone includes three Eastern computing nodes 102E. While only the continental United States is depicted for reference, the present technology may be applied across the entire globe. In addition, more or fewer computing nodes 102 than are depicted may be present in system 100 and each time zone.

The computing nodes 102 receive and process requests for resources throughout each day. The number of requests received by any particular computing node of the computing nodes 102 may depend on the location of the computing node. In addition, the timing of the requests also depends on the location of the computing node. For example, for a particular service, such as content delivery, peak demand may occur between 4:00-7:00 PM local time in each respective time zone. Thus, the peak demand for the Eastern computing nodes 102E occurs at a different time than the peak demand for the Central computing nodes 102C, the Mountain computing nodes 102M, and the Pacific computing nodes 102P. Due to the different times of demand, the computing and cooling requirements for the computing nodes 102 varies based on location. In some examples, however, computing nodes 102 that are within the same time zone may receive peak demand near the same time. Accordingly, determinations regarding when to activate and deactivate computing components and/or cooling systems may be made based on aggregate data from computing nodes within the same time zone.

The demand data may be aggregated across all the computing nodes 102 or aggregated based on the groupings of the computing nodes 102, such as the groupings by time zone. The data aggregation and data analysis may be performed by one or more energy management device 104. The energy management device 104 may be incorporated into one of the computing nodes 102 or may be a separate computing device, or multiple computing devices, that are in communication with the computing nodes 102. The energy management device 104 may also be part of a network orchestration system that orchestrates virtual components within the computing nodes 102.

Different regions or groupings of computing nodes 102 are also possible other than time zone. For example, the computing nodes 102 may be grouped based on their physical proximity to one another. The grouping of computing nodes may also be based on lines of longitude. For example, all computing nodes 102 between 115 degrees longitude and 125 degrees longitude may be grouped together.

Figure 1B:
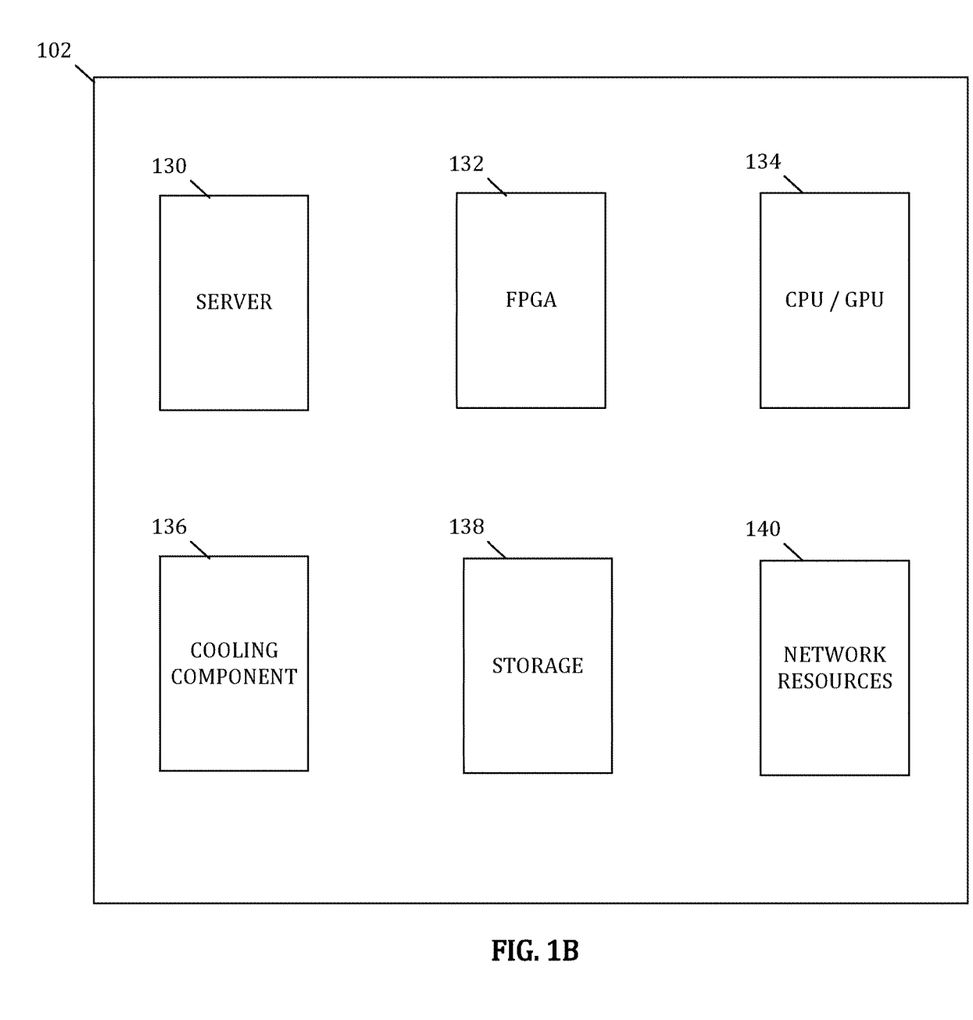
FIG. 1B depicts an example computing node.

FIG. 1B depicts an example computing node 102. The example computing node 102 includes hardware and software to process requests and perform requested services, such as providing content. The computing node 102 may include various components or features, such as servers 130, field-programmable gate arrays (FPGA) 132, central processing units (CPUs) and/or graphics processing units (GPUs) 134, cooling systems 136 (such as fans), storage devices 138, and network resources 140, among other possible computing components or features. The components of the computing node 102 are configured to provide services and compute data.

Settings of the components of the computing node 102 may be altered to change their respective energy consumptions. As an example, cooling systems 136 may be turned on or off. For fans within the cooling systems 136, the speed of the fan may also be controlled. For instance, the speed of the fan may be increased to increase the cooling output or effect of the fan, or the speed of the fan may be decreased to decrease the cooling output or effect of the fan. Decreasing the speed of the fan also reduces the energy consumption of the fan. Settings of other hardware components may also be altered to change their respective energy consumption. For example, clock speeds of the CPUs or GPUs 134 may be increased or decreased. Disk speeds for disks in storage 138 may also be increased or decreased. In addition, application-based changes may also be made. For example, virtualizations or other applications may be unloaded or suspended. As another example, processor priorities for particular applications ma also be changed. The cadence or frequency that applications are scheduled to run may also be adjusted. For instance, the frequency of data collection operations may be reduced during off-peak times.

Figure 1C:
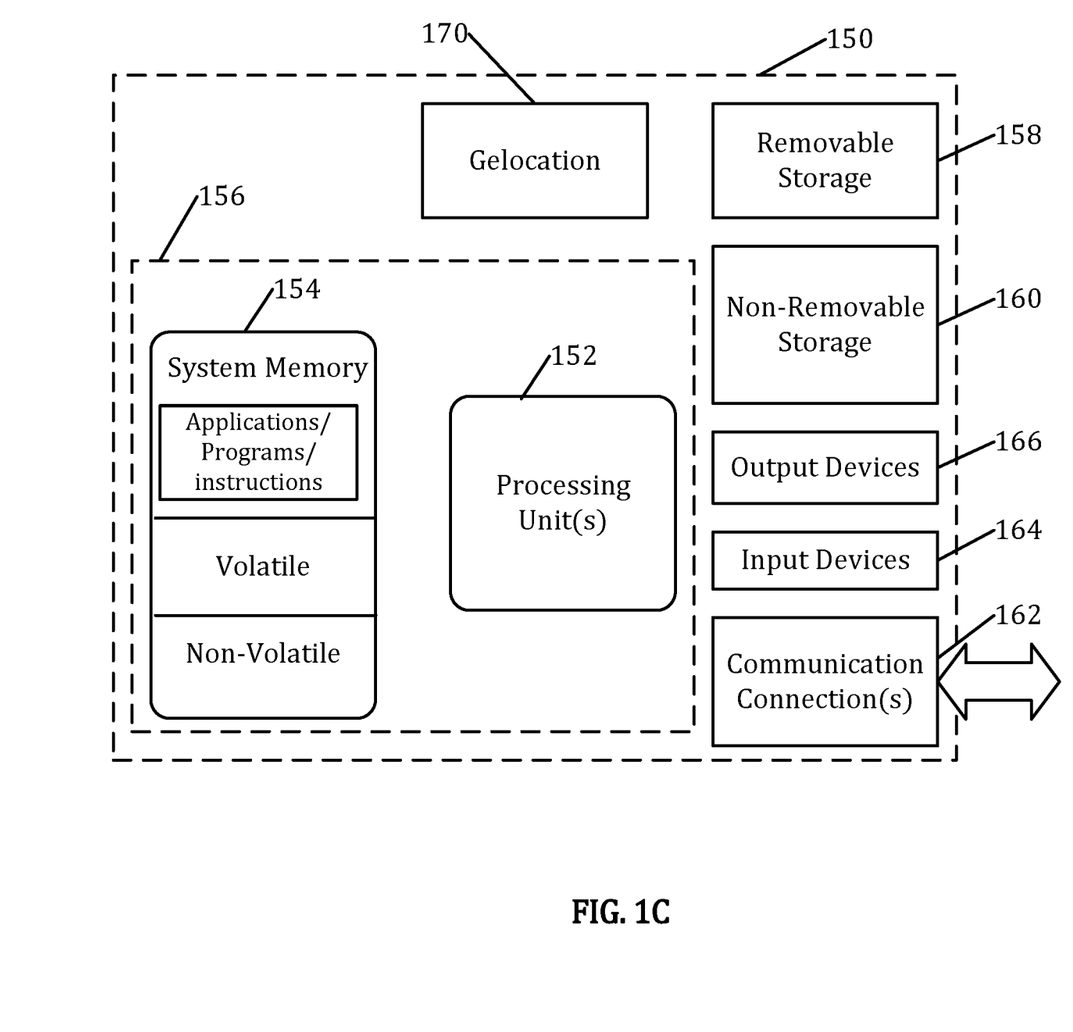
FIG. 1C depicts an example of a suitable operating environment.

FIG. 1C depicts an example of a suitable operating environment that may be implemented by computing node 102, components within the computing node 102, and/or energy management device 104. In its most basic configuration, operating environment 150 typically includes at least one processing unit 152 and memory 154. The processing unit may be a processor, which is hardware. The operating environment 150 thus includes a processor 152 and memory 154 storing instructions that when executed cause the respective system to perform the operations described herein.

Depending on the exact configuration and type of computing device, memory 154 (storing, instructions to perform the processes disclosed herein) may be volatile (such as RAM), non-volatile (such as ROM, flash memory, etc.), or some combination of the two. This most basic configuration is illustrated in FIG. 1C by dashed line 156. The memory 154 stores instructions that, when executed by the processing unit(s) 152, perform the processes and operations described herein, such as generating and interpreting data signals. Further, environment 150 may also include storage devices (removable 158, and/or non-removable 160) including, but not limited to, solid-state, magnetic disks, optical disks, or tape. Similarly, environment 150 may also have input device(s) 164 such as keyboard, mouse, pen, voice input, etc. and/or output device(s) 166 such as a display, speakers, printer, etc. Additional communication connections 162 may also be included that allow for further communication with LAN, WAN, point-to-point, etc. Operating environment 150 may also include geolocation devices 170, such as a global positioning system (GPS) device.

Operating environment 150 typically includes at least some form of computer readable media. Computer readable media can be any available media that can be accessed by processing unit 152 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

Figure 2A:
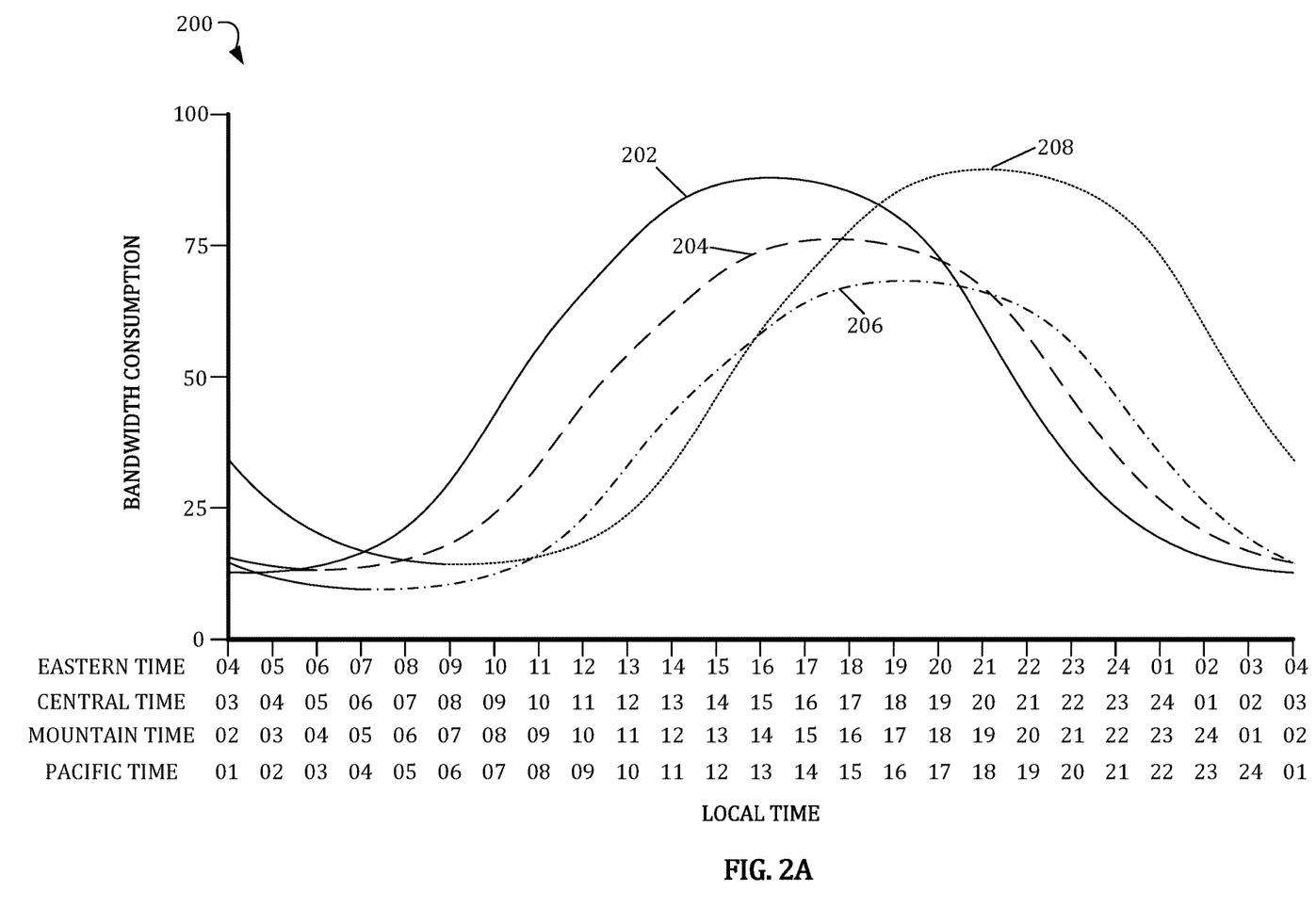
FIG. 2A depicts an example plot of demand for resources over a 24-hour period for multiple time zones.

FIG. 2A depicts an example plot 200 of demand for resources over a 24-hour period for multiple time zones. The plot 200 is a plot of bandwidth consumption versus local time. Bandwidth consumption is a reasonable estimate for demand or usage of a computing node for certain services, such as content delivery. Accordingly, increased bandwidth consumption corresponds to utilization of the components of the computing node, which in turn corresponds to increased heat generation by the components of the computing node. For the example plot 200, the bandwidth consumption has been normalized to values between 0-100. The bandwidth consumption may be measured by bits delivered per unit time from the computing nodes. Other metrics may also be utilized to represent usage rates, such as number of requests.

Curve 202 represents an example plot of data for aggregated bandwidth consumption of computing nodes in the Eastern Time Zone. Curve 204 represents an example plot of data for aggregated bandwidth consumption of computing nodes in the Central Time Zone. Curve 206 represents an example plot of data for aggregated bandwidth consumption of computing nodes in the Mountain Time Zone. Curve 208 represents an example plot of data for aggregated bandwidth consumption of computing nodes in the Pacific Time Zone.

Each of the curves 202-208 has peak at a different point in time relative to other curves. For example, for the Eastern Time Zone curve 202, the peak bandwidth consumption occurs between 15:00-17:00 (i.e., 3 PM to 5 PM) Eastern Time. The peaks for the other curves may occur at similar local times. For example, the Central Time Zone curve 204 has a peak between 15:00-17:00 (i.e., 3 PM to 5 PM) Central Time. The peaks occur at similar local times due to normal schedules of users, such as a typical school day ending around 3 PM and typical work day ending around 5 PM. The shape of each curve 202-208 may also differ. For instance, more bandwidth (e.g., additional requests) may be received in the Eastern Time Zone and the Pacific Time Zone as compared to the Central Time Zones. As should be appreciated, the example curves 202-208 are provided as smooth curves for reference, but real data is less smooth and leads to potential data analysis and decision-making difficulties that are also addressed by the present technology.

Figure 2B:
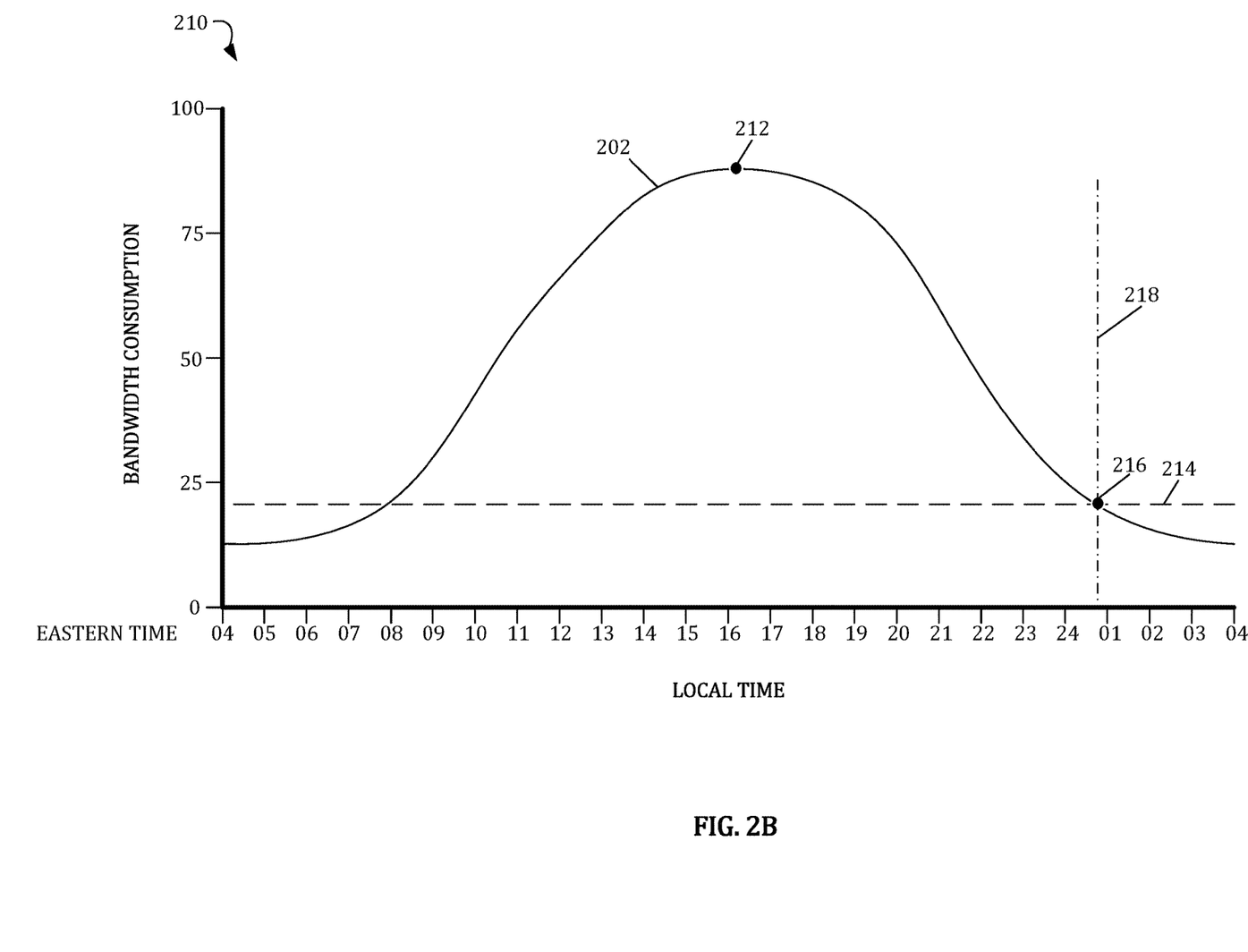
FIG. 2B depicts an example plot of demand for resources over a 24-hour period for a single time zone.

FIG. 2B depicts an example plot 210 of demand for resources over a 24-hour period for a single time zone. More specifically, the plot 210 shows the Eastern Time Zone curve 202 from the plot 200 depicted in FIG. 2A. The Eastern Time Zone curve 202 has a peak 212 bandwidth consumption between 15:00-17:00. At times where substantial bandwidth is being consumed, the cooling systems of the computing nodes are utilized to cool the components of the computing nodes in the Eastern Time Zone. In addition, the computing components within the computing nodes may also need to be operating at higher performance to properly service the requests. When the bandwidth consumption drops below a certain level, however, the output of the cooling systems may be reduced and the performance of the other hardware components of the computing nodes may also be decreased.

The bandwidth consumption level that is suitable for reducing cooling system output or computing performance may be referred to as a usage threshold 214. The point at which the curve 202 intersects the usage threshold 214 when the curve 202 is trending downward is referred to as the threshold intersection point 216. The usage threshold 214 may be determined based on an analysis of aggregate data over one or more previous days and/or on the heat generation characteristics of the particular components within the computing nodes. For example, for content delivery services and other services, the bandwidth consumption plateaus at low-usage level between roughly the hours of 1:00 and 6:00. The aggregated data may be analyzed for previous days to determine the exact time durations for which the bandwidth consumption remains at or below a certain level. For example, the bandwidth consumption level at which the bandwidth consumption remains below for at least two hours based on the aggregated prior data may be utilized as the usage threshold 214. In other examples, the usage threshold may be a percentage of the peak threshold, such as 20%.

In addition to the usage threshold 214, a local time threshold 218 may also be determined from the prior aggregated usage data. The local time threshold 218 may be a time where the bandwidth consumption decreases below the usage threshold 214. For example, the local time threshold 218 may be based on an average local time or maximum local time at which the threshold intersection point 216 occurs in the prior aggregated usage data. Thus, the cooling system output and/or computing component performance may be reduced when the local time is after the local time threshold 218 and the bandwidth consumption is below the usage threshold 214. For example, when the aggregated bandwidth consumption reaches the usage threshold 214 for the current day at a time after the local time threshold 218, the cooling systems and/or the components of the computing nodes in the Eastern Time Zone may be turned down.

In some examples, additional heuristics in addition to the usage threshold 214 and the local time threshold 218 may be applied or evaluated to determine whether the cooling systems and/or the components of the computing nodes should be turned down. In some examples, turning down cooling systems based on a usage threshold 214 alone may result in the cooling systems being turned down prematurely. For instance, a short-duration negative spike in the curve 202 may cause the bandwidth consumption to temporarily dip below the usage threshold 214. Turning down cooling systems or other computing components due to a temporary negative spike may lead to damage of the computing nodes.

To prevent such premature deactivations of the cooling systems or other computing components, one additional heuristic may include requiring that the bandwidth consumption remain below the usage threshold 214 for a threshold duration of time prior to the deactivation of cooling systems or other computing components. The threshold duration of time may be at least 30 minutes, 20 minutes, or 10 minutes, among other examples. The threshold duration may also be based on prior aggregate usage data for the computing nodes. For example, the threshold duration may be a duration of time that is greater than duration of temporary negative spikes in bandwidth consumption in the prior aggregated data.

As another heuristic, the slope or rate of change between the peak 212 and the threshold intersection point 216 may be used. To satisfy the heuristic and deactivate the cooling systems and/or other components, the magnitude of the slope in the current usage data must be less than or equal to a peak-to-threshold slope threshold. The peak-to-threshold slope threshold may be based on the prior aggregated usage data. For instance, the minimum or average peak-to-threshold slope that occurs when the plateau of low bandwidth consumption begins may be determined from the prior aggregated data.

As another heuristic based on slope or rate of change, the slope or rate of change of the bandwidth consumption at or just prior to the threshold intersection point 216 may be analyzed. For example, if the magnitude of the slope of the bandwidth consumption at or just prior to the intersection point is steep, the slope may be indicative of a temporary negative spike rather than a decline leading to a plateau or steady state of low-bandwidth consumption. As examples, the rate of change or slope may be measured 5 minutes, 2 minutes, or 1 minute prior to the threshold intersection point 216. The slope threshold at or just prior to the threshold intersection point 216 may be referred to as the immediate-slope threshold. The immediate-slope threshold may be determined from the prior aggregated usage data. For instance, temporary negative spikes may be identified in the prior aggregated usage data. The slopes of the temporary negative spikes may be determined, and the immediate-slope threshold may be set to be less than the smallest magnitude of slopes of the identified temporary negative spikes.

Other heuristics may also be evaluated. For example, the conditions at a particular computing node may be evaluated prior to reducing the cooling output at that computing node. The evaluated conditions may include temperature of the devices at the particular computing node, power faults at the particular computing node, impairments of network devices, local disk faults, or other similar types of conditions. For instance, if the temperature at a particular computing node is higher than a temperature threshold, the cooling system output for that node may not be decreased. Regional conditions may be also be considered. For instance, if there are regional outages or power grid maintenance, the output of the cooling systems or computing performance of computing nodes may not be reduced. Similarly, scheduled maintenance for a particular computing node or a region of nodes may also be considered. Such scheduled maintenance may alter the normal usage patterns and also operation of the computing node(s), including bandwidth reduction. Thus, if a scheduled maintenance is occurring or set to occur, the output of the cooling systems or computing performance may not be reduced or decreased.

Activation or turning up of the cooling systems and/or other computing components may be more sensitive to changes in the bandwidth consumption to help ensure that the cooling systems and/or the other components are activated prior to the occurrence of significant or substantial bandwidth consumption. While more energy may be wasted if the cooling system is prematurely activated, the components of the computing node are protected from overheating. For example, if at any point the bandwidth consumption increases above an activation threshold, the cooling systems and/or other computing components may be activated. The cooling systems and/or other components may then remain activated or in a turned up state until the heuristics for deactivating the cooling systems and/or other components are satisfied. Thus, in some examples, the cooling systems may activate due to a positive spike in usage but not deactivate due to a negative spike in usage.

Figure 3:
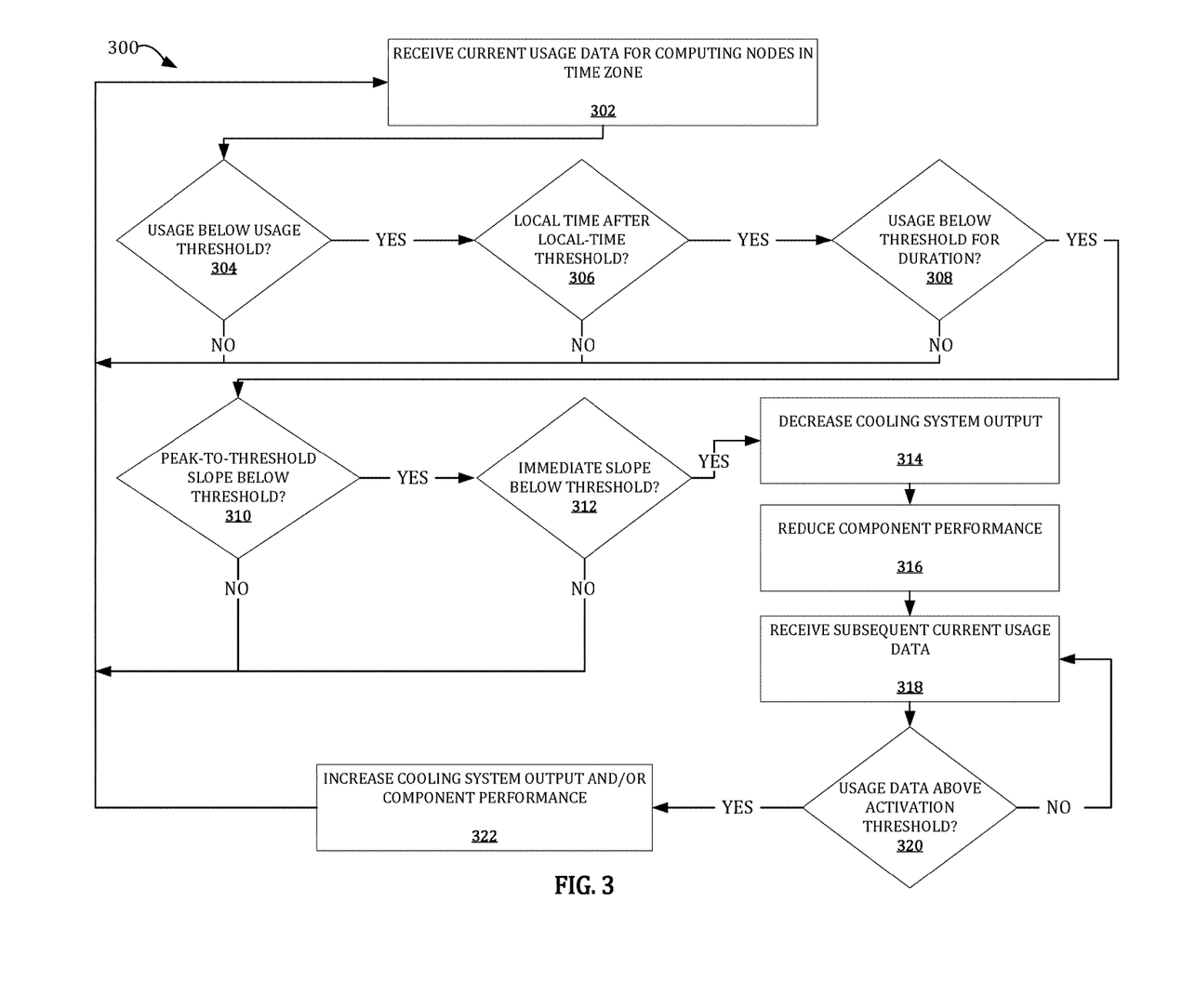
FIG. 3 depicts an example method for reducing energy consumption.

FIG. 3 depicts an example method 300 for reducing energy consumption. The operations of method 300 may be performed the systems discussed herein, or the components thereof, such as an energy management device. At operation 302, current usage data is received for a plurality of computing nodes within a single time zone. The current usage data may be bandwidth consumption or other data indicative of current demand or usage of the plurality of computing nodes. For example, the current usage data may be usage data for a current day. The current usage data may be obtained or received on a continuous or interval basis. In addition, the interval frequency at which the usage data is received may change depending the local time in the time zone and/or the level of the current usage data. For example, during high usage, the current usage data may be obtained more frequently, and during low usage, the current usage data may be obtained less frequently.

Operations 304-312 of method 300 perform or analyze different heuristics to determine whether output of the cooling systems and/or performed of the computing nodes should be reduced to conserve energy. In some examples, more or fewer heuristics may be applied, and the heuristics may be applied in different orders. In addition, some heuristics may be skipping or combined with different Boolean operators, such as AND or OR operations. For example, if at least two of the heuristics are satisfied, then the output of the cooling systems and/or performed of the computing nodes me be reduced to conserve energy. The thresholds and other factors utilized in analyzing the heuristics may be based on aggregated prior usage data, as discussed above and further below with reference to FIG. 4. The thresholds that are utilized in method 300 may also be based on the particular day of the week and/or a particular calendar day. For example, if the current usage data is for a Tuesday the thresholds may be specific to Tuesdays or weekdays, and if the current usage data is for a Saturday, the threshold may be specific to Saturdays or weekends. The particular calendar date or date of annually recurring events may also be utilized to select and apply the appropriate threshold(s). For example, bandwidth consumption is substantially different on New Year's Eve or Super Bowl Sunday than other days. Similarly, Sundays in September through December see increased bandwidth consumption in comparison to Sundays in March through July.

At operation 304, the most recently received current usage data is compared to a usage threshold. If the most recently received current usage data is not below the usage threshold, the method 300 flows back the operation 302 where additional current usage data is received. If the most recently received current usage data is below the usage threshold, the method 300 proceeds to operation 306.

At operation 306, the local time corresponding to the most recently received current usage data is analyzed. For example, the local time is compared to a local-time threshold. If the local time is not after the local-time threshold, the method 300 flows back to operation 302 where additional current usage data is received. If the local time is after the local-time threshold, the method 300 proceeds to operation 308.

At operation 308, a determination is made as to whether the usage data has been below the usage threshold for a threshold duration. If the usage data has not been below the usage threshold for the threshold duration, the method 300 flows back to operation 302 where additional current usage data is received. If the usage data has been below the usage threshold for the threshold duration, the method 300 proceeds to operation 310.

At operation 310, a peak-to-threshold slope for the current usage data is analyzed. To determine the peak-to-threshold slope, a peak of the current usage data may be identified. The peak of the current usage data may be the maximum usage data level for the current day. The peak may be identified by the corresponding usage data value and the local time at which the peak occurred. A threshold intersection point may also be identified. The usage data value of the threshold intersection point may be the same as the value of the usage threshold. The peak-to-threshold slope for the current usage data may then be determined or calculated and compared to a peak-to-threshold slope threshold. If the magnitude of determined peak-to-threshold slope for the current usage data is not below the peak-to-threshold slope threshold, the method 300 flows back to operation 302 where additional current usage data is received. If the magnitude of determined peak-to-threshold slope for the current usage data is below the peak-to-threshold slope threshold, the method 300 proceeds to operation 312.

At operation 312, an immediate slope of the current usage data at or immediately prior to the threshold intersection point is determined and compared to an immediate-slope threshold. If the determined immediate slope of the current usage data is not below the immediate-slope threshold, the method 300 flows back to operation 302 where additional current usage data is received. If the determined immediate slope of the current usage data is below the immediate slope threshold, the method 300 proceeds to operation 314.

At operation 314, output of cooling systems of the plurality of computing nodes is reduced. As an example, reducing the output of the cooling systems may be performed by deactivating or reducing the speed of fans within the cooling systems. In some examples, deactivating or reducing fan speeds may include deactivating or reducing fan speeds for only a subset of the fans in the cooling system. The subset of fans that are affected may vary from day to day to help wear-level the entire set of fans. For example, on a first day, a first subset of fans may be deactivated or have their speeds reduced. On a second day, a second subset of fans may be deactivated or have their speeds reduced. Other components of cooling systems, such as water or coolant pumps, may also be deactivated or have their speeds reduced.

At operation 316, the performance of computing components within the computing nodes is reduced. For example, reducing performance of the computing components may include reducing drive speed of storage disks. In addition, reducing performance may also, or alternatively, include reducing clock speeds of CPUs and/or GPUs.

At operation 318, subsequent current usage data is received from the plurality of computing nodes in the time zone. The term subsequent current usage data refers to current usage data that is received while the cooling system output is reduced and/or the computing component performance is reduced. At operation 320, a comparison is made between the received subsequent current usage data and an activation threshold. The activation threshold may be the same as the usage threshold used in operation 304. In other examples, the activation threshold may be greater than or less than the usage threshold. For example, the activation threshold may be less than the usage threshold to allow for the cooling systems to be activated more easily than deactivated.

If the received subsequent usage data is not above the activation threshold, the method flows back to operation 318 where additional subsequent current usage data is received. If the subsequent current usage data is above the activation threshold, the method 300 proceeds to operation 322. At operation 322, the cooling system output is increased and/or the computing component performance is increased. For example, the features or properties of the cooling systems that were reduced or deactivated in operation 314 are reactivated or increased in operation 322. Similarly, the features or properties of the computing components that were deactivated or reduced in operation 316 are reactivated or increased in operation 322. Subsequent to operation 322, the method flows back to 302 where the method 300 repeats to determine when to reduce the output of the cooling systems and/or the computing component performance.

By utilizing only a single heuristic or threshold for reactivation of the cooling systems, the method 300 is able to be more sensitive to reactivation of the cooling systems than it is to the deactivation of the cooling systems. Thus, the computing nodes are more likely to be protected from overheating. In other examples, however, to help conserve additional energy, additional heuristics may be evaluated prior to reactivating the cooling systems and/or computing components. For example, the heuristics in operations 304-312 may be effectively applied in reverse.

Figure 4:
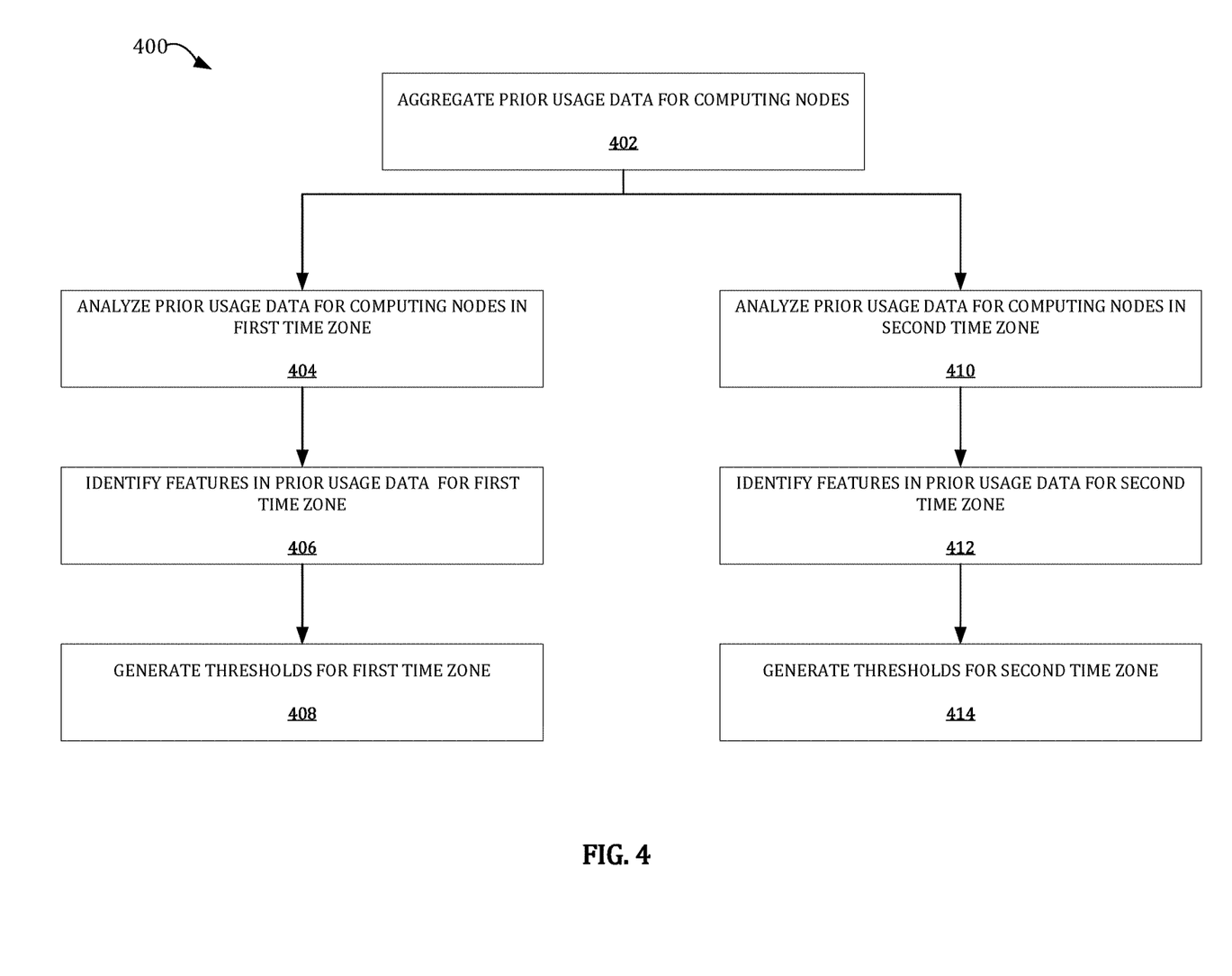
FIG. 4 depicts an example method for reducing energy consumption.

FIG. 4 depicts an example method 400 for reducing energy consumption. More specifically, the method 400 generates thresholds for use in method 300 depicted in FIG. 3 and described above. The operations of method 400 may be performed the systems discussed herein, or the components thereof, such as an energy management device. At operation 402, prior usage data for a computing nodes is aggregated. The prior usage data may be aggregated from computing nodes across multiple time zones. The prior usage data may be the same type of data as the current usage data but for a prior time period. For example, the prior usage data may be bandwidth consumption for a prior time period, such as over the past few days (e.g., 2-5 days), over the past week, over the past few weeks (e.g., 2-5 weeks), over the past month, over the past few months (e.g., 2-5 months), over the past year, or over the past few years (e.g., 2-5 years).

At operation 404, prior usage data for a plurality of computing nodes in a first time zone is analyzed. For example, the prior usage data that is aggregated from the Pacific computing nodes may be analyzed. The analysis may include a statistical or graphical analysis to provide information to determine features in the prior usage data for the first time zone in operation 406. The determined features may include a daily peak, a low-usage plateau, usage spikes, statistical distributions, among other features. The daily peak may be a value of the usage data that is the maximum value for the usage data of a particular day. The low-usage plateau may be a feature where the prior usage data remains at a low usage period for an extended duration for a particular period of time being analyzed. For example, in content delivery networks, a low-usage plateau occurs most every night generally for a few hours. That low-usage plateau may be identified for each day in the prior usage data. The low-usage plateau may be identified as a duration for which the prior usage data stays below a certain value. That value may be based on the heat generation characteristics of the computing components in the computing nodes in the first time zone and/or the cooling system capacity for the computing nodes in the first time zone.

Short-duration negative spikes in the prior usage data may also be identified. The negative spikes may be identified by rapid changes in the prior usage data. As an example, in content distribution networks, negative spikes may occur at regular or expected intervals, such as on the hour and thirty minutes past the hour, which corresponds to traditional television schedules.

At operation 408, based on the features identified in operation 406, thresholds are generated for the first time zone. For example, a usage threshold for the first time zone may be determined based on the identified low-usage plateau. The usage threshold may be based on the usage data levels of the low-usage plateau. The usage threshold may also be based on the daily peak value. For example, the usage threshold may be a percentage of the daily peak value of the prior usage data. A local-time threshold may also be based on the low-usage plateau. For example, the local-time threshold may be based on the average daily start time of the low-usage plateau in the prior usage data. A duration threshold may also be determined based on the low-usage plateau as well as the identified negative spikes in the prior usage data. The duration threshold may be based on the duration of the negative spikes. For example, the duration threshold may be set to be greater than the maximum or average duration of the identified spikes. An activation threshold may also be determined based on the low-usage plateau and other features of the prior usage data.

A peak-to-threshold slope threshold may also be determined based on identified daily peaks in the prior usage data. For example, a peak-to-threshold slope may be determined for each day in the prior usage data. The minimum magnitude or average magnitude of the determined peak-to-threshold slopes may be used as the peak-to-threshold slope threshold. In addition, an immediate-slope threshold may also be determined based on the identified negative spikes and/or the low-usage plateau. For example, the immediate-slope threshold may be set to a value that has a magnitude less than the minimum or average slopes of the identified negative slopes in the prior usage data. The thresholds generated in operation 408 and stored for use in deactivating and activating cooling systems and computing components in the computing nodes for the first time zone.

The operations 404-408 may also be performed for prior usage data for computing nodes in additional time zones to generate thresholds that are specific to the computing nodes in the additional time zones. For example, at operation 410, prior usage data for computing nodes in a second time zone is analyzed and features of the prior usage data for the second time zone may be determined at operation 412. Thresholds for the computing nodes in the second time zone may be determined in operation 414. The types of thresholds determined in operation 414 may be the same types of thresholds that are generated in operation 408, discussed above. The thresholds determined in method 400 may also be updated. For example, method 400 may repeat on a regular basis or time interval, such as once per day, once per week, once per month, or similar intervals.

Figure 5:
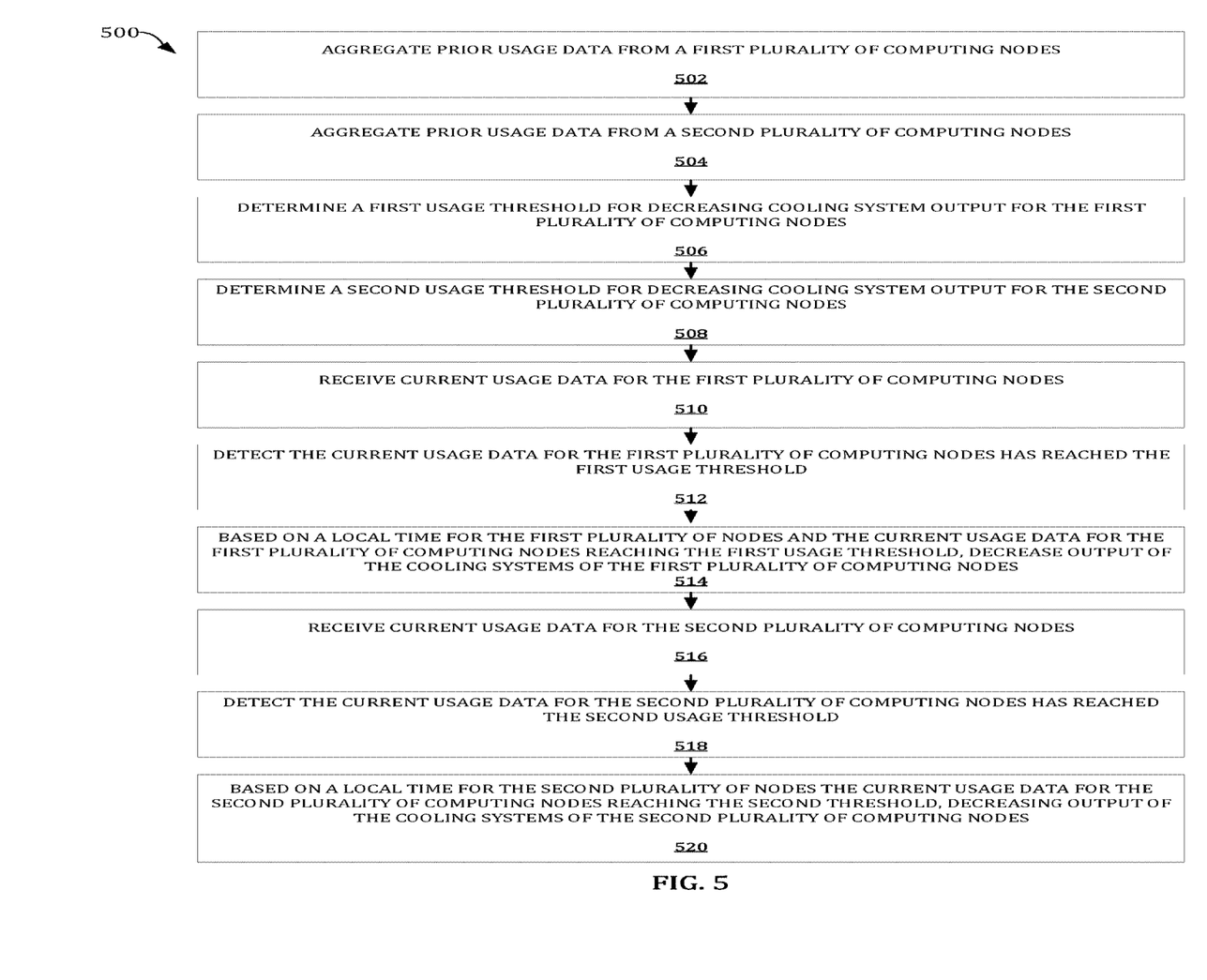
FIG. 5 depicts an example method for reducing energy consumption.

FIG. 5 depicts an example method 500 for reducing energy consumption. At operation 502, prior usage data from a first plurality of computing nodes is aggregated for a prior time period. The operations of method 400 may be performed the systems discussed herein, or the components thereof, such as an energy management device. The first plurality of computing nodes may be computing nodes within a first time zone or region that shares a common local time. At operation 504, prior usage data from a second plurality of computing nodes is aggregated for the prior time period. The second plurality of computing nodes may be computing nodes within a second time zone or region that shares a common local time.

At operation 506, based on the aggregated prior usage data from the first plurality of computing nodes, a first usage threshold is determined for decreasing cooling system output for the first plurality of computing nodes. At operation 508, based on the aggregated prior usage data from the second plurality of computing nodes, a second usage threshold is determined for decreasing cooling system output for the second plurality of computing nodes.

At operation 510, current usage data for the first plurality of computing nodes is received. At operation 512, the current usage data for the first plurality of computing nodes is detected or determined to have reached the first usage threshold. At operation 514, based on a local time for the first plurality of nodes and the current usage data for the first plurality of computing nodes reaching the first usage threshold, output of the cooling systems of the first plurality of computing nodes is decreased or reduced.

At operation 516, current usage data for the second plurality of computing nodes is received. At operation 518, the current usage data for the second plurality of computing nodes is detected or determined to have reached the second usage threshold. At operation 520, based on a local time for the second plurality of nodes the current usage data for the second plurality of computing nodes reaching the second threshold, output of the cooling systems of the second plurality of computing nodes is decreased.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system for reducing energy consumption in providing remote resources, the system comprising:
    a first plurality of computing nodes in a first time zone, wherein the first plurality of computing nodes include cooling systems;
    a second plurality of computing nodes in a second time zone, wherein the second plurality of computing nodes include cooling systems; and
    an energy management device including a processor and memory storing instructions that when executed cause the system to perform a set of operations comprising:
        aggregating prior usage data from the first plurality of computing nodes;
        aggregating prior usage data from the second plurality of computing nodes;
        based on the aggregated prior usage data from the first plurality of computing nodes, determining a first usage threshold for decreasing cooling system output for the first plurality of computing nodes;
        based on the aggregated prior usage data from the second plurality of computing nodes, determining a second usage threshold for decreasing cooling system output for the second plurality of computing nodes;
        receiving current usage data for the first plurality of computing nodes;
        detecting that the current usage data for the first plurality of computing nodes has reached the first usage threshold;
        based on a local time for the first plurality of nodes and the current usage data for the first plurality of computing nodes reaching the first usage threshold, decreasing output of the cooling systems of the first plurality of computing nodes;
        receiving current usage data for the second plurality of computing nodes;
        detecting that the current usage data for the second plurality of computing nodes has reached the second usage threshold;
        based on a local time for the second plurality of nodes and the current usage data for the second plurality of computing nodes reaching the second threshold, decreasing output of the cooling systems of the second plurality of computing nodes;
        determining a slope immediately prior to a threshold intersection point of the current usage data for the first plurality of computing nodes; and
        determining that a magnitude of the determined slope is less than an immediate-slope threshold; and
        wherein decreasing output of the cooling systems of the first plurality of computing nodes is further based on the determination that magnitude of the determined slope is less than the immediate-slope threshold.

2. The system of claim 1, wherein the cooling systems of the first plurality of computing nodes include fans, and decreasing the output of the cooling systems includes decreasing a speed of at least a subset of the fans.

3. The system of claim 1, wherein the operations further comprise, based on a local time for the first plurality of nodes and the current usage data for the first plurality of computing nodes reaching the first usage threshold, decreasing performance of the first computing nodes by reducing at least one of a drive speed or a CPU clock speed.

4. The system of claim 1, wherein decreasing the output of the cooling systems includes decreasing the output of only a portion of the cooling systems.

5. The system of claim 1, wherein the first plurality of computing nodes and the second plurality of computing nodes are part of a content delivery network.

6. A method for reducing energy consumption in providing remote resources, the method comprising:
    receiving current usage data for a first plurality of computing nodes in a first time zone;
    detecting that the current usage data for the first plurality of computing nodes has reached a first usage threshold;
    based on a local time for the first time zone and the current usage data for the first plurality of computing nodes reaching the first usage threshold, decreasing output of cooling systems of the first plurality of computing nodes;
    receiving current usage data for a second plurality of computing nodes in a second time zone;
    detecting that the current usage data for the second plurality of computing nodes has reached a second usage threshold;
    based on a local time for the second plurality of nodes and the current usage data for the second plurality of computing nodes reaching the second threshold, decreasing output of cooling systems of the second plurality of computing nodes;
    determining a slope immediately prior to a threshold intersection point of the current usage data for the first plurality of nodes; and determining that a magnitude of the determined slope is less than an immediate-slope threshold; and wherein decreasing output of the cooling systems of the first plurality of nodes is further based on the determination that magnitude of the determined slope is less than the immediate- slope threshold.

7. The method of claim 6, further comprising:

determining, at a time duration subsequent to the current usage data for the first plurality of computing nodes reaching the first usage threshold, that the current usage data remains below the first usage threshold; and wherein decreasing output of the cooling systems of the first plurality of nodes is further based on the determination that the current usage data remains below the first usage threshold.

8. The method of claim 6, further comprising based on the local time for the for the first time zone and the current usage data for the first plurality of computing nodes reaching the first usage threshold, decreasing performance of the first computing nodes by reducing at least one of a drive speed or a CPU clock speed.

9. The method of claim 6, wherein decreasing the output of the cooling systems includes decreasing the output of only a portion of the cooling systems.

10. The method of claim 6, wherein the first plurality of computing nodes and the second plurality of computing nodes are part of a content delivery network.

11. A method for reducing energy consumption in providing remote resources, the method comprising:

aggregating, for a prior time period, prior usage data from a plurality of computing nodes;

based on the aggregated prior usage data from the plurality of computing nodes:

determining a usage threshold for decreasing cooling system output for the plurality of computing nodes; and determining a local-time threshold for decreasing the cooling system output for the plurality of computing nodes;

receiving current usage data for the plurality of computing nodes;

when the current usage data reaches the usage threshold and the local time is after the local-time threshold, decreasing output of the cooling systems of the plurality of computing nodes;

based on the aggregated prior usage data, determining an immediate-slope threshold;

determining a slope immediately prior to a threshold intersection point of the current usage data;

determining that a magnitude of the determined slope is less than the immediate-slope threshold; and wherein decreasing output of the cooling systems is further based on the determination that magnitude of the determined slope is less than the immediate-slope threshold.

12. The method of claim 11, wherein the method further comprising:

subsequent to decreasing output of the cooling systems, receiving subsequent usage data for the plurality of computing nodes;

detecting that the subsequent usage data has reached an activation threshold; and based on detecting that the subsequent usage data has reached an activation threshold, increasing output of the cooling systems of the plurality of computing nodes.

13. The method of claim 11, further comprising, when the current usage data reaches the usage threshold and the local time is after the local-time threshold, decreasing performance of the plurality computing nodes.

14. The method of claim 11, wherein the plurality of computing nodes are part of a content delivery network.

* * * * *